Patented Nov. 12, 1963

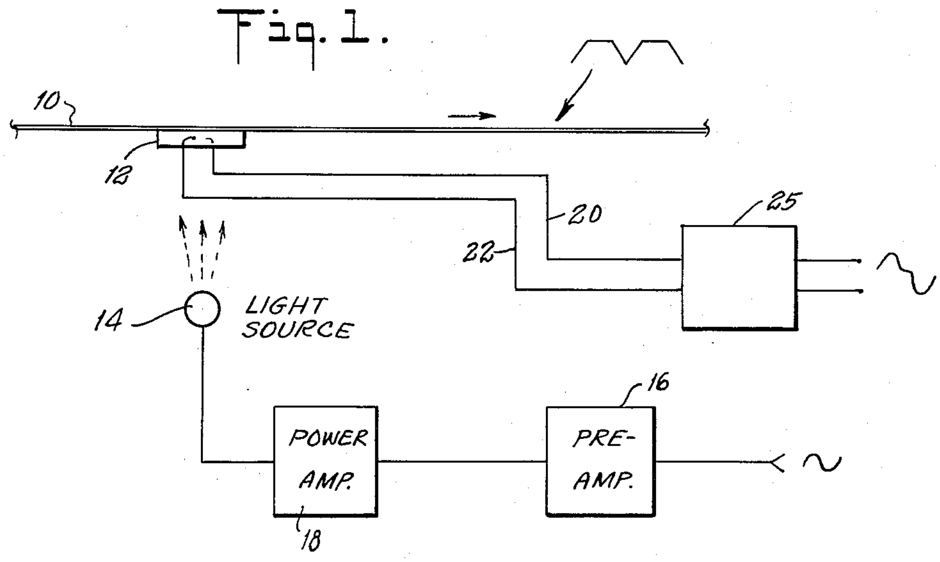
Fig. 2.
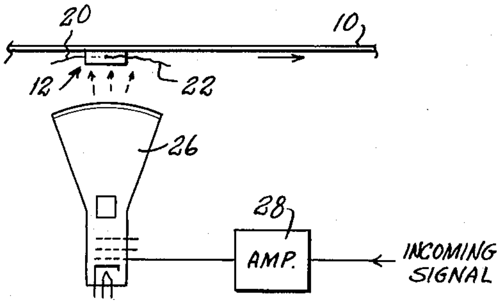
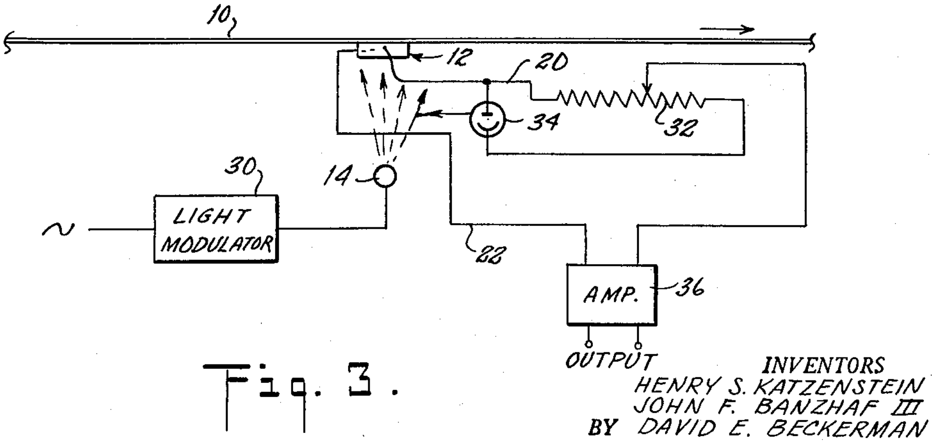
Fig. 3.
INVENTORS
HENRY S. KATZENSTEIN
JOHN F. BANZHAF III
BY DAVID E. BECKERMAN
Darby & Darby
ATTORNEYS INVENTORS
HENRY S. KATZENSTEIN
JOHN F. BANZHAF III
BY DAVID E. BECKERMAN
Darby & Darby
ATTORNEYS INVENTORS
HENRY S. KATZENSTEIN
JOHN F. BANZHAF III
BY DAVID E. BECKERMAN
Darby & Darby
ATTORNEYS INVENTORS
HENRY S. KATZENSTEIN
JOHN F. BANZHAF III
BY DAVID E. BECKERMAN
Darby & Darby
ATTORNEYS United States Patent Office 3,110,801

3,110,801

MULTIPLYING SYSTEMS EMPLOYING PHOTO-MAGNETO-ELECTRIC FLUX-RESPONSIVE MAGNETIC PICKUP HEADS

Henry S. Katzenstein, Leonia, N.J., and John F. Banzhaf III, Bronx, and David E. Beckerman, Brooklyn, N.Y., assignors to Lear Siegler Inc., a corporation of Delaware Filed Sept. 16, 1959, Ser. No. 840,339
9 Claims. (Cl. 235—194)

This invention relates to systems for effecting multiplication of variables in the form of electric and magnetic functions.

The systems of this invention are built around the use of a pickup head comprising a semiconductor excited by radiant energy in conjunction with a magnetic field, a number of examples of which are disclosed in our co-pending application Serial No. 840,265, filed September 16, 1959, and now abandoned.

A broad object of the invention is to provide simplified and highly efficient systems for effecting the multiplication of two or more variables characterized in that one of the variables in recorded in the form of a magnetic track on a magnetizable medium and the other is provided in the form of a variable excitation of a semi-conductor subject to the recorded magnetic field.

The various and detailed objects of the invention will best become apparent in connection with the following description of the several embodiments of the invention selected for illustrative purposes herein and diagrammatically illustrated in the accompanying drawings.

In the drawings:

FIGURE 1 is a diagrammatic and schematic illustration of one form of system by means of which two signals representing the variables to be multiplied are combined into a single composite signal;

FIGURE 2 is a diagrammatic illustration of another form of such system;

FIGURE 3 is still another modified form of the invention wherein means is provided to balance out the photo-voltaic effect arising in such system and degrading the desired output signal;

Figure 5:
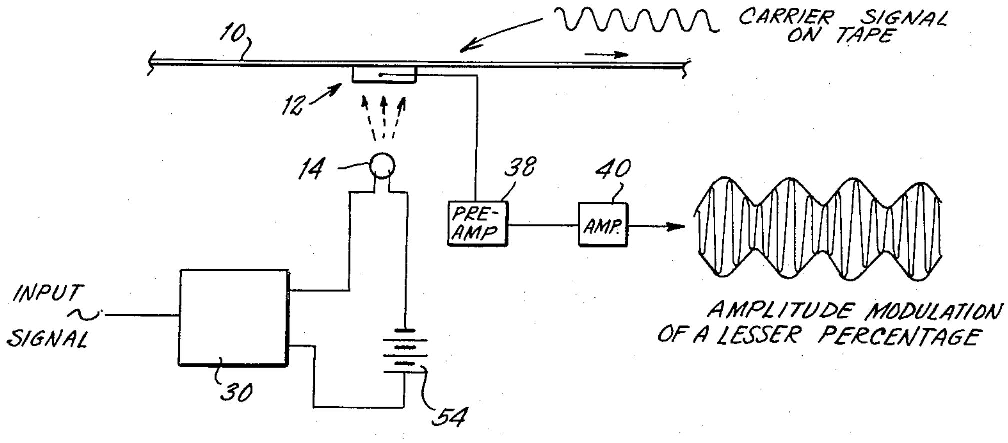
Figure 6:
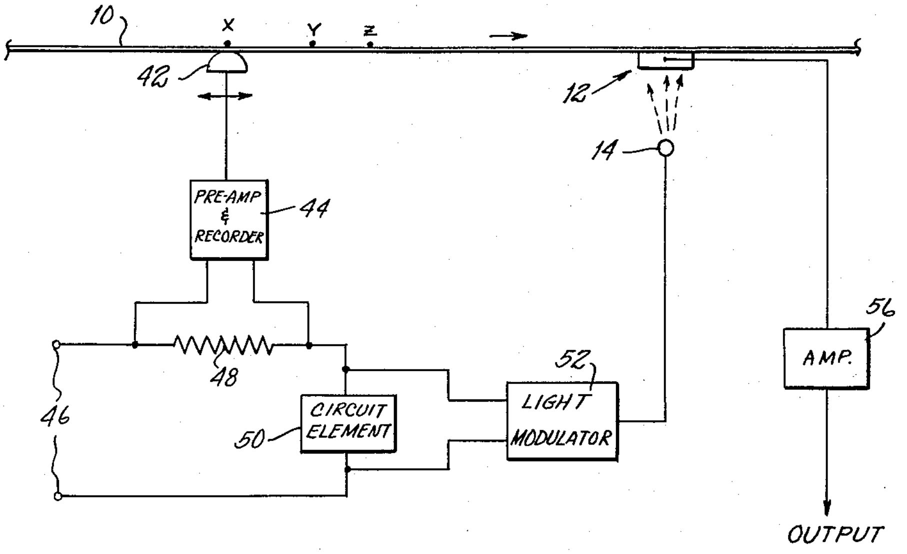
Figure 7:
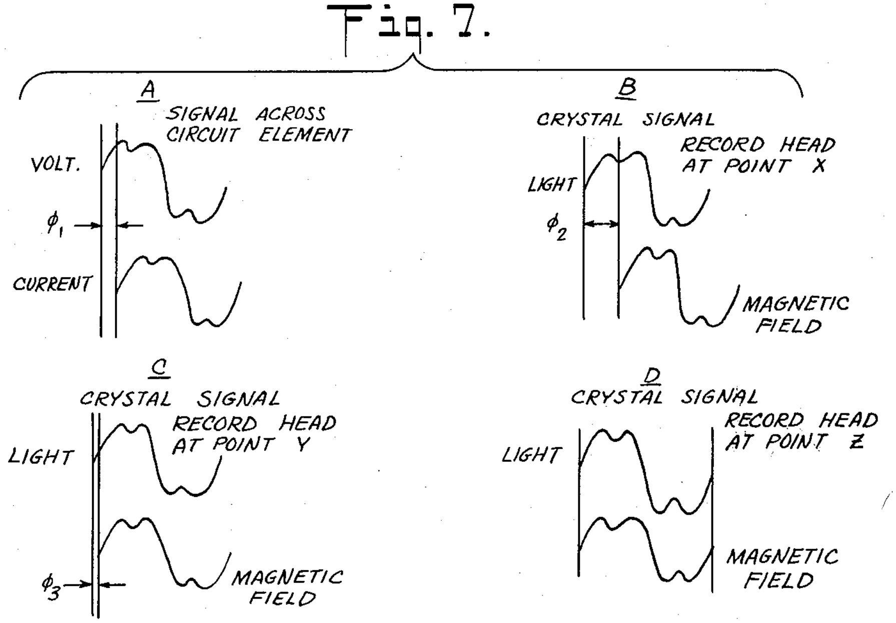
Figure 8:
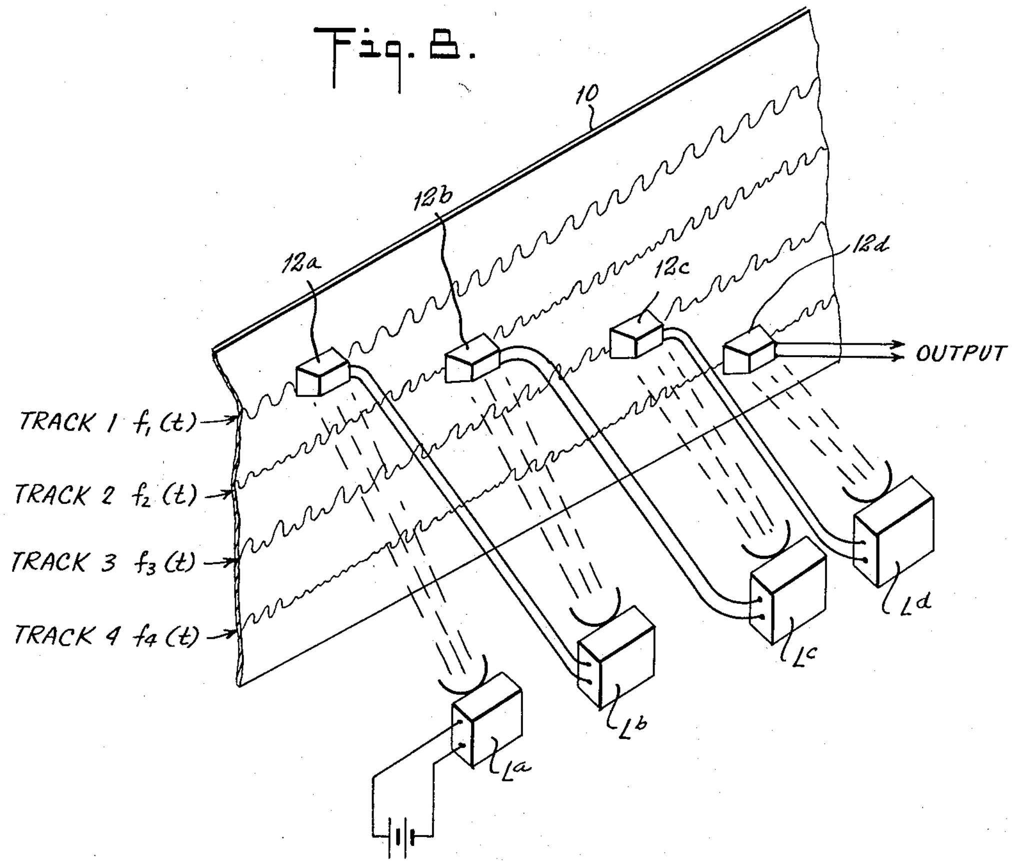
Figure 9:
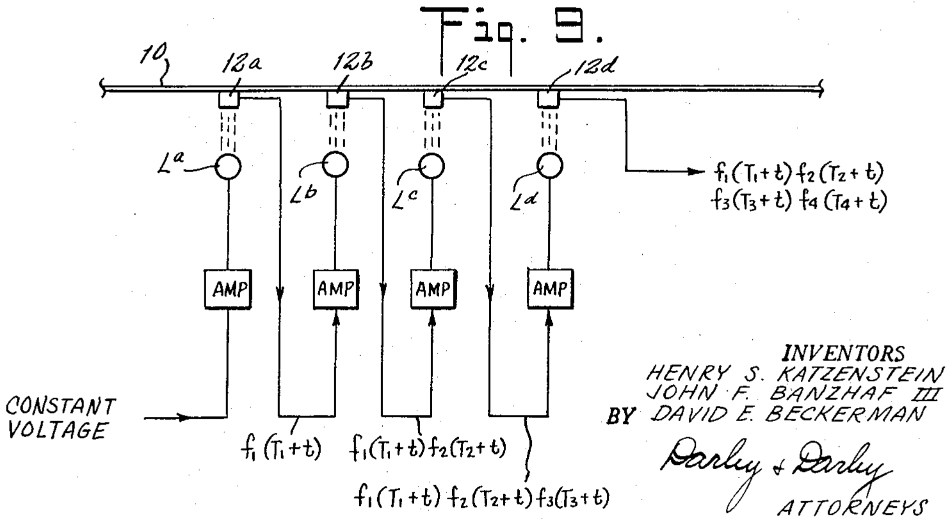

FIGURE 5 diagrammatically illustrates still another system effecting a lower percentage of amplitude modulation of the output signal;

FIGURE 6 is a diagrammatic illustration of still another modified form of circuit for effecting multiplication including a novel form of variable time delay element;

FIGURE 7 comprises a series of curves illustrating the effect of the variable time delay element;

FIGURES 8 and 9 are diagrammatic illustrations in plan and side elevation of another system in accordance with this invention by means of which several signals may be multiplied together with controlled time delays.

As disclosed in our above mentioned application and sufficiently described herein for the purposes of this disclosure, the systems for accomplishing the objects of this invention are based upon the property of a semiconductor material of developing a potential across the ends thereof when simultaneously subjected to a magnetic field, and radiant energy directed thereon. A simple form of this system is illustrated in FIG. 1, wherein the magnetic field is produced, for example by a magnetic track on a magnetizable medium 10 such as a magnetizable tape. As disclosed in the above mentioned application, semiconductors can be used to develop a photo-magneto-electric flux effect in any magnetic field. It follows, therefore, that the magnetic record can be recorded on other forms of magnetizable medium, such as a drum, a disc, a wire, or any non-magnetizable body carrying a magnetizable coating.

For purposes of simplification, a magnetic tape record is illustrated in the various embodiments of this invention with the tape 10 arranged to move lengthwise in close proximity to and preferably in contact with a semi-conductor body 12 of any suitable form. Many conductors are available for this purpose and by way of example it is noted that three preferred semiconductor materials of either the N, intrinsic, or the P types are Ge, Si and InSb. The semiconductor 12 can be in the form of a rectangular or other shape piece of such material across one face of which the tape 10 is moved. The other face is illuminated by any suitable source of radiant energy, and as disclosed in some detail in our above mentioned application, these sources may be sources of visible light, invisible light or atomic particles.

Thus the diagrammatic source of radiant energy 14 is intended to be representative of any source of energy which will excite a semiconductor for the purposes of this invention. Assuming, for example that the source 14 is an incandescent lamp, it is supplied with power from any suitable current source through a preamplifier 16 and an amplifier 18, by means of which the energizing current produces illumination which varies as the input signal. Thus, as indicated, the energizing current for the lamp 14 could be modulated with a sinusoidal signal. The opposite ends of the semiconductor are conductively connected by the leads 20 and 22 to the input of a work circuit 25, which for example could be an amplifier having output terminals as indicated. In this arrangement it will be assumed that the signal having a trapezoidal wave form as indicated, has been recorded on the magnetic tape 10.

With this arrangement, assuming that the tape 10 is in motion longitudinally, the varying magnetic field of the recorded signal on the tape 10 will react with the sinusoidal excitation of the semiconductor by reason of the impingement of the light from the source 14 thereon, producing in the output circuit of the semiconductor a composite signal which is the product of the two.

To illustrate the flexibility of this system the arrangement of FIG. 2, which can be used for the same general purposes of FIG. 1, differs in that the incident radiant energy impinging on the semiconductor 12 is generated by a cathode ray tube 26. This cathode ray tube will have the usual fluorescent screen on the end face thereof and the electron beam from its gun will be modulated by the signal to be combined with the magnetic record on the tape 10, representative of the other variable. The incoming signal is preferably amplified by the amplifier 28 and is applied to a control grid of the cathode ray tube 26 to effect modulation of the cathode ray beam of the tube. This will in turn produce a modulated spot of light on the screen which will illuminate the semiconductor 12 to provide an output signal which is the product of the variables to be multiplied.

It is noted that the output of a semiconductor pickup head of this type is proportional to the product of the magnetic flux density and light intensity to which it is subjected. However, the excitation of the semiconductor by radiant energy may produce a photo-voltaic effect which degrades or reduces the purity of the output signal. In the system of FIG. 3 provision is made to neutralize this effect. This system is basically like the system of FIG. 1, to which has been added a photo-electric signal to neutralize this photo-voltaic effect. Thus, as before, there is a tape 10 carrying a magnetic record of one of the variables to be multiplied. As before, there is a semiconductor element 12 and a source of radiant energy 14 modulated in its light output by the other variable by means of the modulating circuit 30. As before, the output leads 20 and 22 for the semiconductors are connected to the input of a work circuit 36, in the case illustrated, an amplifier.

Adjustably included in series with the lead 20 is a resistor 32 in parallel with a photo-electric cell 34. The resistor 32 has a variable connection which completes the lead 20 and the photo-electric cell 34 is positioned to be subject to the modulated beam of radiant energy from the source 14. Thus, the required portion of the voltage generated by the photo-electric cell, which can be proportioned by the variable contact of a resistor 32, is added to the voltage generated by semiconductor 12 to cancel the photo-voltaic effect produced. Thus, it will be seen that this system is basically the same as that of FIG. 1, with the refinement discussed.

From what has been said before, it can be seen that another application of this invention would be its use in amplitude modulating systems. For example, if the illumination of the semiconductor produced by the source 14 is made to vary by the frequency of the carrier signal, the output of the system will represent the carrier amplitude modulated by the signal carried by the tape in the form of a magnetic record.

Figure 4:
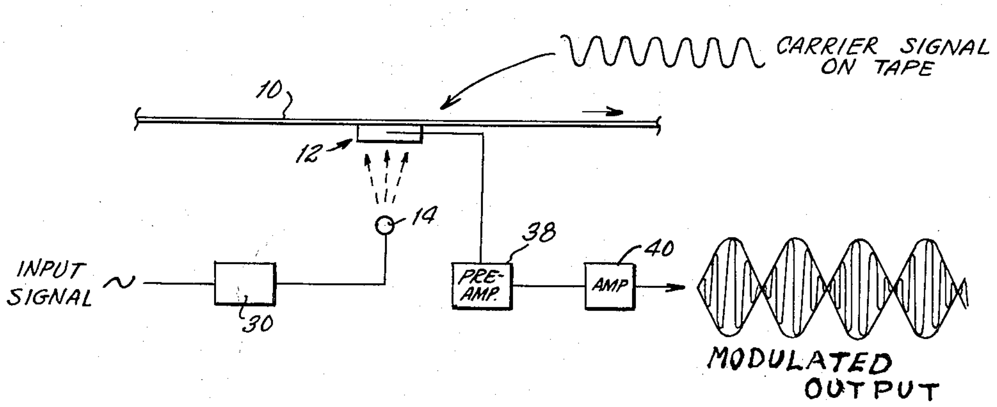
FIGURE 4 is still another modified form of system in which the composite output signal represents a modulated signal.

As will be at once apparent to those skilled in the art, the arrangement can be reversed in that the carrier could be recorded on the tape and the modulating signal could be applied to control the illumination of the source 14 of the semiconductor. In effect the system of FIG. 4 is quite like that of FIG. 1 with the exception that the magnetic record on the tape, as indicated, comprises the carrier signal. The signal to be modulated is applied through an amplifier 30 to produce modulation of the light generated by the source 14. The output of the semiconductor is passed through the preamplifier 38 and the amplifier 40 to produce modulation of the output signal as indicated in FIG. 4.

The system of FIG. 5 merely illustrates the further flexibility of this arrangement in that by the addition of a D.C. bias by battery 54 as shown, a lower percentage of amplitude modulation of the carrier signal can be effected. For this reason all of the parts of the system of FIG. 5 have been given the same reference characters as the corresponding parts of the system of FIG. 4.

In the system of FIG. 6 there is illustrated the utility of the basic system of this invention for effecting multiplication of two signals. For example, the voltage across a typical circuit element 50 is used to modulate the radiant energy or light source and the current, the other signal to be multiplied, may be used to drive the recording head 42 and thus produce a magnetic record of the current signal on the magnetic medium 10. The product of the two comprises the output of the pickup head, that is the semiconductor. This arrangement is illustrated in FIG. 6, where an electric potential is applied across the input terminals 46 of a circuit including a resistor 48 and a circuit element 50 in series therewith. The input terminals of an amplifier 44 are connected across the ends of the resistor 48 and its output is fed to a recording head 42 which records the current signal in the form of a magnetic track on the tape 10. The input of an amplifier-modulator 52 is connected across the circuit element 50, and its output, the voltage signal from the circuit element, is supplied to the light source 14 which illuminates the semiconductor 12.

The output of the semiconductor 12 is connected to the input of an amplifier 56 for any suitable use. The output signal of the amplifier 56 is the product of the two signals and represents the apparent power or volt-amperes if the time delay between the recording and the pickup head is adjusted to compensate for the time lag between the voltage and the current signal. This time lag can be adjusted by changing the separation between the recording and the pickup heads, which function is diagrammatically illustrated by the double headed arrow in FIG. 6.

These conditions are diagrammatically illustrated in the charts of FIG. 7. Chart A diagrammatically illustrates one form of signal that might be developed. The upper curve of this chart represents the voltage and the lower chart the current, having a phase separation of $\phi_1$. The effects of shifting the recording head with respect to the semiconductor to the various points X, Y and Z are indicated in the charts B, C, and D. With the recording head at the point X the phase relationship of $\phi_2$ is established between the effects on the semiconductor of the incident light and of the magnetic field of the tape. In the case of chart D, the recording was moved to point Z, where these two effects will be in phase and $\phi$ will be zero. These charts thus illustrate that the time lag may be adjusted by changing the relative positions of the recording and the pickup heads, i.e. their spacing.

Thus the system of FIG. 6 combines in one device the functions of a multiplier and a variable time delay factor without the limitations and difficulties suffered by prior systems having the same objectives. The output signal of the semiconductor is directly proportional to the light intensity and the intensity of the magnetic field on the tape 10. Thus, if one signal is recorded on the magnetic tape and the other signal to be multiplied therewith is made to modulate the light source, the semiconductor signal is a product of the two. By adjusting the position of the recording and pickup heads the phase of the components of the output signal may be varied with extreme accuracy by varying the separation of the heads.

It will also be understood by those skilled in the art that the light source may be modulated in many different ways, including a power amplifier to drive the light (with or without D.C. bias), adjusting the intensity of an electron beam with a grid as in the cathode ray tube by the use of a relaxation oscillator or mechanically as with a spinning wheel or a Polaroid screen or by oil vapor projection as now used in the projection of a television picture.

It is important to realize that the response of a semiconductor in this system is linear with respect to frequency down to zero frequency, and the upper frequency limit can be greatly extended by the use of high speed scanning techniques. Thus, with the systems herein disclosed, major problems of multiplication and phasing can be solved in a relatively simple manner.

Thus, in FIG. 8 there is illustrated a magnetic tape 10 having recorded therein four different signals indicated by $f_1(t)$, $f_2(t)$, $f_3(t)$ and $f_4(t)$ using standard mathematical notation to represent 4 independent time varying functions. The signals are recorded on four separate magnetic tracks on the magnetic tape which are numbered according to the subscripts of the separate signal functions. The number of tracks, of course, could be extended to $n$ to facilitate the recording of $n$ signals of the form $f_n(t)$. The tracks could be simultaneously recorded, using any standard multi-track head recording system, or may be recorded using separate recording heads, or by any other means commonly utilized by the art.

As diagrammatically illustrated in these two figures a series of semiconductor pickup heads $12^a$, $12^b$, $12^c$ and $12^d$ are respectively aligned with the four tracks, as shown, but are arranged so that their position along the line of motion of the tape may be changed. Each of these semiconductors is individually excited by means of radiant energy sources $L^a$, $L^b$, $L^c$ and $L^d$. Assuming that $L^a$ is a source of constant illumination the output of the semiconductor head $12^a$ will be $f_1(T_1+t)$, where $T_1$ represents a variable time delay since the pickup heads can be placed at any desired relative positions along the line of motion of the tape. If the output of the pickup head $12^a$ is used to modulate the source of illumination for the pickup head $12^b$, that is the source $L^b$, its output will represent the product of the two signals or $f_1(T_1+t)\ f_2(T_2+t)$. In each case, of course, the time delays $T_1$ and $T_2$ can be continuously varied so that the phase of the signal can be controlled.

From the above it can be easily seen that any function of the type $f_1(T_1+t)f_2(T_2+t)f_3(T_3+t) \ldots f_n(T_n+t)$ may be obtained by cascading the heads and varying their positions along the path of the tape. It will be understood by those skilled in the art, of course, that the output of each pickup head can be amplified to provide a strong enough signal to product effective modulation of the light output of the source of illumination $L^a$, $L^b$, $L^c$, $L^d$.

As a variant of this system, as in the normal application of the cross correlator, where a function of the type $f_1(t)f_2(T_2+t)$ is the desired output, it could easily be obtained by having the known function $f_1(t)$ modulate the light source of the pickup head while the unknown function $f_2(t)$ is recorded on the magnetic tape track. Thus multiplication is effected by the interaction of the modulated light and the magnetic flux upon the semiconductor while the phase relationship is easily altered by changing the relative position of the record and pickup head. Heretofore both operations of multiplication and phasing had presented considerable difficulties.

In much the same manner, an auto correlator might be constructed to produce an output of the form $$f_1(t)f_1(T_1+t)$$

by using the same signal $f_1$ to modulate the source of radiant energy and to drive the record head. Thus the output would represent the unknown signal multiplied by itself with a controllable time delay. It will be understood, of course, by those skilled in the art that the case of the auto correlator and the cross correlator, the amplified output from the semiconductor will be integrated. However, since difficulties are most generally encountered only in the multiplication and phasing, the standard methods of signal integration need not be illustrated.

Still another application of this arrangement is raising a given signal to a given integral power. Thus, if a given signal $f_1$ is recorded on four separate magnetic tracks, and the heads and illuminators are cascaded as indicated and adjusted to eliminate any phase differences, the output will represent $f_1(t)f_1(t)f_1(t)f_1(t)$ or the input raised to the fourth power. It will be seen that this is of course applicable to any integer power.

From the above it will be seen that with the appropriate circuitry and physical arrangement, heads using the photo-magneto-electric flux effect may provide simply and easily an output of the form $f_1(T_1+t)f_2(T_2+t) \ldots f_n(T_n+t)$. Several important applications of this function which have been illustrated include a cross correlator, an auto correlator and a device for raising signals to given powers. Other variations of these systems will be apparent to those skilled in the art.

The disclosure herein is given for the purpose of illustrating the invention and it is desired that the protection afforded hereby be not limited thereto but only as required by the appended claims.

What is claimed is:

1. In a system of the type herein disclosed, the combination comprising means carrying a plurality of magnetic tracks representative of a plurality of variables, a plurality of pickup heads, one for each of said tracks comprising semiconductors, independent means for subjecting each of said semiconductors to a beam of radiant energy, and means for modulating some of said radiant energy means by the output signals of some of said semiconductors.

2. In the combination of claim 1, said semiconductors being positioned at different points along said tracks.

3. In the combination of claim 1, said semiconductors all being aligned on a single transverse line with respect to said first means.

4. In the combination of claim 1, said first means comprising a magnetic tape.

5. In the combination of claim 1, the output of each of said semiconductors minus one successively connected to said respective radiant energy means so that the output signals of the respective semiconductors successively modulate the respective radiant energy means minus one.

6. In the combination of claim 1, said magnetic tracks comprising records of different variables.

7. In the combination of claim 1, said magnetic tracks comprising records of the same variable.

8. In the combination of claim 1, said semiconductors being positionable along said tracks to vary the phase between the signals recorded on said tracks.

9. In a system of the type herein disclosed, the combination comprising means for storing a plurality of magnetic tracks representative of respective functions, a plurality of pickup heads, one for each of said tracks, comprising semiconductors, means for controllably moving said tracks with respect to said pickup heads, independent means for subjecting each of said semiconductors to a beam of radiant energy, and means for modulating some of said radiant energy means by the output signals of some of said semiconductors.

References Cited in the file of this patent

UNITED STATES PATENTS 2,936,373 Welker et al. ............ May 10, 1960

OTHER REFERENCES

Smith: "Analog Multiplier and Control Device," IBM Technical Disclosure Bulletin, vol. 1, No. 4, December 1958.

Smith: "Punched Card Reader," IBM Technical Disclosure Bulletin, vol. 1, No. 4, December 1958.

Dixon: "Photoelectromagnetic Effect in Indium Arsenide," Physical Review, vol. 107, No. 2, July 15, 1957.

Grosvalet: (French) "L'Effet Photomagnetoelectrique en Regime Sinusoidal Dans les Semi-conducteurs," Annales de Radioelectricite, vol. 9, No. 38, October 1954.